United States Patent [19]

Lai

[11] Patent Number: 4,605,455

[45] Date of Patent: Aug. 12, 1986

[54] METHOD OF MANUFACTURING SHOES

[76] Inventor: An-Cheng Lai, No. 133, Chen Cheng Street, Su-Lin Town, Taipei District, Taiwan

[21] Appl. No.: 659,284

[22] Filed: Oct. 10, 1984

[51] Int. Cl.⁴ .......... B32B 5/28; B29C 39/18; A43D 65/00; A43D 95/14

[52] U.S. Cl. .............. 156/78; 12/142 RS; 156/93; 156/220; 156/245; 156/275.1; 264/26; 264/46.4; 264/244; 264/293; 264/337

[58] Field of Search ........... 264/26, 46.4, 46.5, 264/244, 337, 293; 12/142 RS

[56] References Cited

U.S. PATENT DOCUMENTS

| | | | |
|---|---|---|---|
| 3,258,861 | 7/1966 | Niconchuk | 264/46.5 X |
| 3,345,664 | 10/1967 | Ludwig | 264/46.4 X |
| 3,480,704 | 11/1969 | Ludwig | 264/46.4 |
| 3,698,108 | 10/1972 | Brunner | 264/46.4 X |
| 3,814,781 | 6/1974 | Oka et al. | 264/46.4 X |
| 4,296,053 | 10/1981 | Doerer et al. | 264/46.4 X |

Primary Examiner—Philip Anderson
Attorney, Agent, or Firm—Benasutti & Murray

[57] ABSTRACT

A method of manufacturing a shoe which comprises forming a foamed outsole in a mold cavity and cementing an insole to the formed outsole during molding. The mold is made of a silicone rubber and has a deeper cavity for forming the outsole and a shallow cavity for receiving an insole. An upper with multi-colors is fabricated by cementing differently colored plastic segments and a lining cloth by high frequency sealing.

7 Claims, 6 Drawing Figures

METHOD OF MANUFACTURING SHOES

BACKGROUND OF THE INVENTION

This invention relates to a method of manufacturing shoes, particularly to a method in which the insole is bonded to the outsole when the outsole is fabricated.

Conventionally, in making a shoe, it is necessary to fabricate the insole and the outsole separately and then cement them together by using an adhesive. The outsole is made by blending suitable raw materials and then injecting them into a metal mold. Such a process can only offer a molded outsole of a single color. During the injection molding, since it is necessary to provide high pressure for injection, the process can not be controlled to provide a foamed outsole having a density less than 0.8. The density of the foamed outsole is usually greater than 0.8, thus resulting in a high weight outsole.

Furthermore, in making an upper having combined colors, different colored plastic segments are required to be combined together by sewing which is a time consuming task. In addition, if the edges of each segments are not folded during sewing, the finished upper may not present a good appearance.

SUMMARY OF THE INVENTION

It is an object of the invention to provide an improved method of making a shoe in which an insole is cemented to an outsole during fabrication of the outsole having a foamed body.

Another object of the invention is to provide an improved method of making a shoe in which an insole can be cemented to an outsole without using an adhesive.

A further object of the invention is to provide an improved method of making a shoe in which a multi-colored outsole, insole or upper is fabricated by cementing different colored plastic segments with high frequency sealing.

These and other objects can be achieved in accordance with the invention through the provision of a method of fabricating a shoe having an outsole with an interior foam body and an insole cemented thereto which comprises (a) preparing an upper mold piece and a lower mold piece made of a silicone rubber composition having 80% aluminum powder, the lower mold piece having a deeper mold cavity for shaping the outsole and a shallow cavity for receiving the insole, the shallow cavity being located above the deeper mold cavity; (b) placing pieces of plastic sheet against the wall of the deeper cavity, (b) introducing a weighed plastic foam composition into the deeper cavity; (d) cutting an insole from a sheet of insole material and placing it in the shallow cavity above the foam composition; and (e) heating the upper and lower mold pieces to cause the content in the deeper cavity to form into an outsole and to cause the insole to cement with the outsole. The heating can be accomplished by an high frequency heating apparatus.

The method according to the invention further comprises (f) bonding an upper to the insole and the outsole. A multi-colored upper can be fabricated by combining differently colored plastic segments and cementing them to a lining cloth by high frequency sealing.

The presently exemplary preferred embodiment will be described in detail with reference to the accompanying drawings, in which:

DETAILED DESCRIPTION OF THE PREFERRED EMBODIMENT

Figure 1:
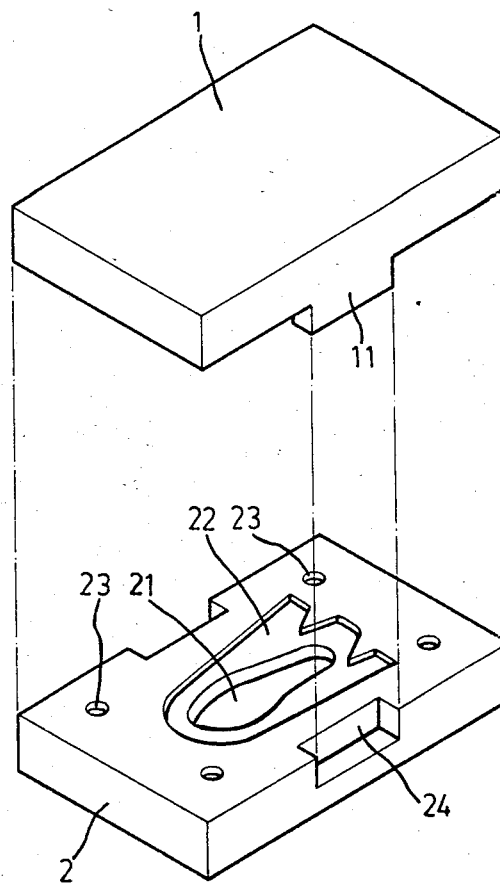
FIG. 1 is a schematic view of an upper mold piece and a lower mold piece.

Referring to FIG. 1, there is shown a mold assembly used for making a shoe in which a mid sole can be incorporated into an outsole during molding the outsole. The mold assembly includes an upper mold piece 1 and a lower mold piece 2 which are made of silicone rubber. The lower mold piece 2 is comprised of a mold cavity 21 used for forming a foamed outsole, a shallow recess 22 used for receiving a midsole, pin holes 23 and notches 24. The upper mold piece 1 is provided with projections (not shown) which are used to engage with the corresponding pin holes 23 and notches 24 for preventing the movement of the upper and lower mold pieces relative to one another.

The mold pieces 1 and 2 are made of silicone rubber which contains 80% by weight of aluminum powder for improving the transfer of heat from the mold to the content to be molded. In case, no aluminum powder is included in the silicone rubber, it will result in disuniform distribution of heat in the mold when the mold is instaneously heated by a high frequency apparatus as well as a roughness in the surface of the shoe due to the deficient heat conduction. If the time of the high frequency heating is prolonged, the components in the molding mixture will decompose or be carbonized, rendering the molding impossible.

To avoid the occurrence of a short circuit which may burn the outsole and the mold, between the contact surfaces of the upper and lower mold pieces 1 and 2 are provided an interposed layer preferably of 3 mm thickness, which is made of silicone rubber without aluminum powder incorporated therein. The layer of 3 mm thickness can be accomplished by overlaying a layer of silicone rubber of 1.5 mm thickness on each surface of the upper and lower mold pieces, or overlaying a layer of 3 mm thickness on the contact surface of the upper of lower mold piece.

Figure 2:
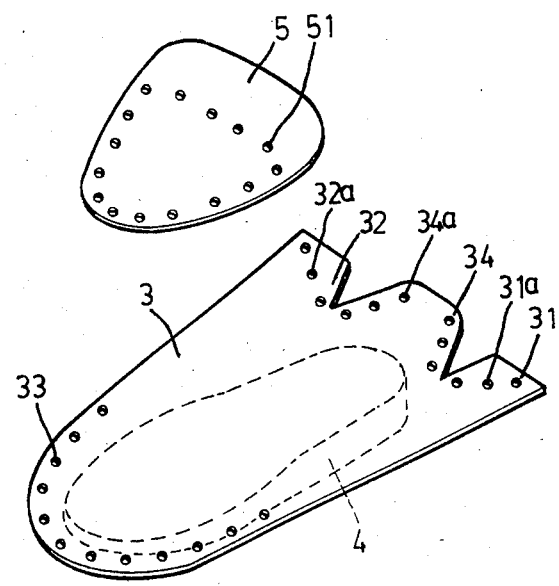
FIG. 2 is a schematic view showing an outsole, an insole and the upper of an embodiment.
Figure 6:
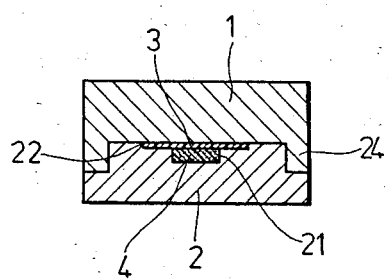
FIG. 6 is an elevational view in section of the upper and lower mold pieces of FIG. 1 during the molding process.

An example of the fabrication of a shoe is described hereinunder. A weighed foamable PVC resin composition is poured into the cavity 21. The weight of composition is so chosen that it will produce an outsole having a density 0.7–0.8. In case of requiring an outsole having combined colors, differently colored pieces of PVC sheet may be placed against the wall of the cavity 21 before pouring the composition. In the shallow recess 22 is placed a PVC leather sheet which is cut to a predetermined shape. Then the mold is closed as shown in FIG. 6 and heated for an instant upto a temperature of 220° C. to 250° C. by a high frequency heating apparatus. The outsole 4 formed is a foamed body and is cemented with the insole PVC leather 3, as shown in FIG. 2.

Figure 3:
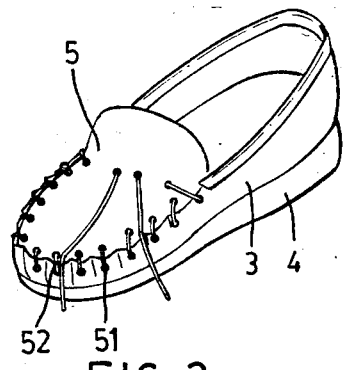
FIG. 3 is a schematic view of a shoe as the same embodiment as FIG. 2.

Referring again to FIG. 2, the insole sheet 3 is broader and longer than the area of the outsole 4, and its width gradually increases from its front portion 33 to its rear portion. The rear portion of the insole sheet 3 is provided with three separate blade portions 31, 32 and 34. and the front portion 33 is arched. The adjacent marginal portions of these blade portions 31, 32 and 34 are fastened together by using a string threading through eyelets 31a, 32a and 34a, thereby forming a rear rounding part at the heel of the shoe. The front part 33 of the insole sheet 3 is provided with eyelets 33a. The upper 5 which is provided with eyelets 51 is fastened to the front part 33 by using shoelaces 52. The finished shoe is shown in FIG. 3. It can be appreciated that the whole shoe is fabricated without using adhesive and without sewing.

Figure 5:
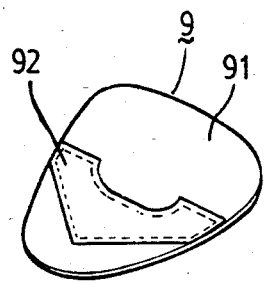
FIG. 5 shows an upper which is provided with a pattern of sewn stitches.

The upper 5 may be provided with various patterns or an appearance of a sewn stitch. In making an upper, a piece of plain PVC sheet and a piece of lining cloth which are cut to a proper shape are placed together in a die which is designed to impart a required pattern to the upper. By high frequency sealing the PVC sheet is bonded to the cloth and a desire pattern is formed on its surface. If an upper with different combined colors is desired, differently colored and properly shaped plastic segments and a lining cloth may be placed in the die and sealed together by high frequency sealing. FIG. 5 shows an upper 9 which includes a base sheet 91 and a segment 92 which is different in color from the sheet 91, the segment 92 being sealed to the sheet 91 and provided with a pattern of sewn stitches thereon. Since the segment is sealed to the sheet 91, it is not necessary to provide folds at the edges of segment 92.

Figure 4:
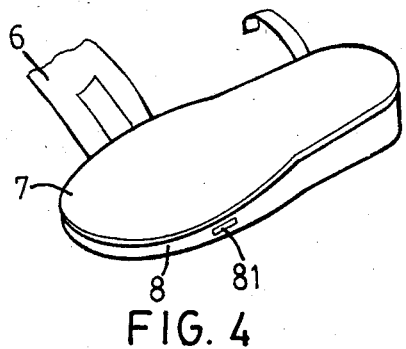
FIG. 4 is a schematic view of a shoe of another embodiment.

Another embodiment of the invention is shown in FIG. 4, the shoe includes a foamed outsole 8, an insole 7 and a slip-on upper 6. In fabricating, the insole 7 and one side of the slip-on upper 6 is cemented to the outsole 8 simultaneously with the formation of the foamed outsole 8. This is done in the same manner as done in the former embodiment. The other side of the slip-on upper 6 is inserted in and adhesively bonded to the recess 81 which is formed during molding.

With the invention thus explained, it is apparent that various modifications and variations can be made without departing from the scope of the inventin. It is therefore intended that the scope of the invention be limited as indicated in the appended claims.

What I claim is:

1. A method of fabricating a shoe having a foamed outsole and an insole bonded to the outsole comprising:
   (a) preparing a mold having an upper mold piece and a lower mold piece, the lower mold piece having a deeper mold cavity for shaping the outsole and a shallow cavity for receiving the insole, the shallow cavity being located above the deeper mold cavity;
   (b) introducing an amount of foamable resin composition into the deeper cavity sufficient to produce an outsole;
   (c) cutting a piece of insole from a sheet of insole material and placing it in the shallow cavity above the resin composition; and
   (d) heating the upper and lower mold pieces to cause the composition in the deeper cavity to foam and be formed into a foamed outsole and to cause the insole to be bonded to the outsole.

2. A method as claimed in claim 1, said upper mold piece and lower mold piece are made of a silicone rubber composition having 80% by weight of aluminum powder.

3. A method of making a shoe having a foamed outsole and an insole bonded to the outsole comprising:
   (a) preparing a mold having an upper mold piece and a lower mold piece, said lower mold piece comprising a deep mold cavity for shaping an outsole and a shallow mold cavity of a certain shape sufficient to receive an insole sheet, the shallow cavity being located above and in communication with the deep mold cavity;
   (b) introducing an amount of foamable resin composition into the deep mold cavity sufficient to produce an outsole;
   (c) placing a piece of insole sheet in the shallow cavity above the resin composition, the insole sheet being longer and broader than the surface area of the outsole so that all lateral portions thereof will extend beyond the surrounding marginal edge of the outsole when it is bonded to the outsole, the front lateral portion being arched and the rear lateral portion being formed into three separate blade portions;
   (d) closing the lower mold piece with the upper mold piece and heating the mold to cause the composition in the deep cavity to foam and adhere to the insole sheet;
   (e) cooling the mold and releasing the outsole and insole from the mold;
   (f) bending the lateral portions of the insole upward to form parts of an upper, and stitching the adjacent marginal portions of the blade portions to form a rounded part at the heel of the shoe; and
   (g) taking a piece of sheet and joining it to the bent front lateral portions of the insole by stitching or fastening with a string.

4. A method as claimed in claim 3, wherein said piece of sheet in step (g) is an instep-covering upper sheet which has an arched marginal portion to be joined with the front lateral portions of the insole.

5. A method as claimed in claim 3, wherein said upper mold piece and lower mold piece are made of a silicone rubber composition having 80% by weight of aluminum powder.

6. A method as claimed in claim 1 wherein an upper is attached to the bonded insole and outsole, and further wherein said upper is provided with different colors, in which the method further comprises combining differently colored plastic segments and bonding them to a lining cloth by high frequency sealing.

7. A method as claimed in claim 6, further comprising providing the appearance of sewn stitches to the upper by high frequency embossing.

* * * * *